Feb. 22, 1949.  C. N. NICODEMUS ET AL  2,462,540
RELEASE COUPLING
Filed July 26, 1946
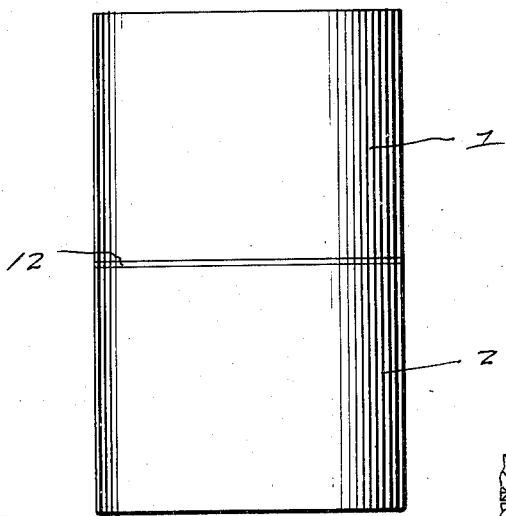
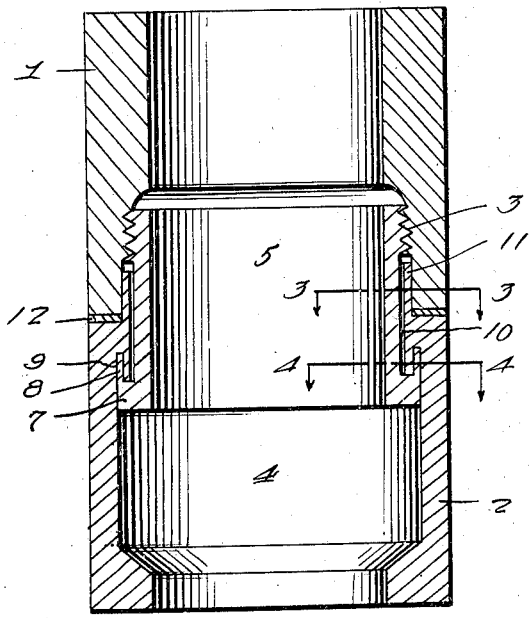
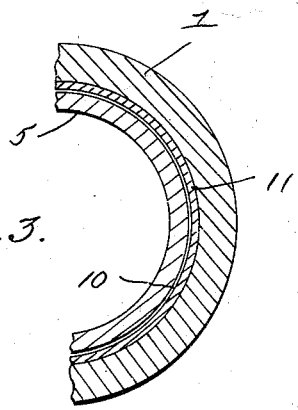
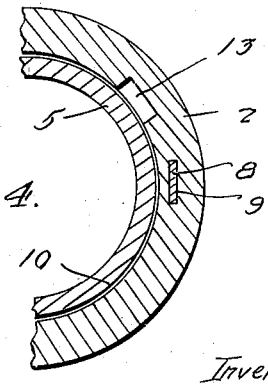
Inventors
Carroll N. Nicodemus
Albert E. Gregg
Attorneys.

Patented Feb. 22, 1949

2,462,540

UNITED STATES PATENT OFFICE 2,462,540

RELEASE COUPLING

Carroll N. Nicodemus and Albert E. Gregg, Ashland, Ohio

Application July 26, 1946, Serial No. 686,358

2 Claims. (Cl. 285—168)

The present invention relates to release couplings and is more particularly concerned with a release coupling for oil well casings and the like.

The primary object of the invention is to provide a simple and durable release coupling which is readily adaptable to pipe lines in oil and gas wells, or other pipe lines where it is desirable to uncouple or sever the line at a given place.

Another object of the invention is to obviate pulling or lifting of a pipe to uncouple same. Such action with well-drilling or other equipment creates a dangerous hazard.

A further object of the invention is to provide a release coupling for pipe lines which will permit connected sections to be forced up or down, wherever necessary, without releasing the coupling.

With the foregoing and other objects and advantages in view the invention consists of the novel construction and arrangement of parts hereinafter described and claimed.

In the acompanying drawings illustrating the preferred embodiment of this inventive concept:

Figure 1 is a side elevation of the invention.

Figure 2 is a longitudinal section of the device.

Figure 3 is a fragmentary horizontal section on line 3—3 of Figure 2, and

Figure 4 is a fragmentary section on line 4—4 of Figure 2.

The reference characters, as used in the description and drawings, designate the same parts of construction.

Referring to the drawings, 1 and 2 are the two interlocking sections of the coupling unit. As will be understood, this coupling is designed to fit on and connect the ends of portions of a pipe line, and, therefore, are tubular in cross-section. Section 1 is provided with an annular enlargement of the bore, part way from one end and this is threaded as at 3. The bore of section 2 is enlarged, except for the portion at one end which fits the piping.

The annular enlargement 4 of the bore of section 2 is designed to contain a longitudinally slidable sleeve or gland 5 which is exteriorly threaded at one end as at 6, to engage threads 3 of section 1. This sleeve is provided at the opposite end with diametrically disposed a flange 7 having vertically projecting diametrically opposed lugs 8 which are designed to engage sockets 9 on the underside of an annular shoulder 10 on the section 2 and adjacent the meeting edge of section 2. Said lugs prevent rotation of sleeve 5 when section 1 is threaded on.

An annular, reduced part 11 projects from the transverse meeting end of section 2 and is designed to fit the interior wall of the meeting end of section 1 to form a seal. Between the meeting ends of sections 1 and 2 is interposed a packing ring sealing element 12 of lead or other suitable sealing material and when the sections 1 and sleeve 5 of this coupling are interthreaded a sealed joint is produced where the parts meet.

A separate release coupling will be provided where there are a plurality of pipe sections to be joined and when it is desired to remove a pipe length it is unthreaded from the couplings by turning, thus obviating lifting and pulling. By depressing the gland to disengage lugs 9, and turning until the lugs register with the longitudinal slots 13, parts 2 and 5 can be disassembled.

When desirable, an entire pipe line with couplings attached, may be withdrawn from the well but where the pipe has been set in the well solidly, it will be necessary to release a coupling by turning the pipe at the top of the well, as heretofore explained.

This coupling will withstand all needed force for pushing or pulling the joined sections of pipe and furthermore it would be impossible to release the coupling by accidental or intentional jerking of the pipe line during the casing operation of a well. To lift or pull on a pipe with the well-drilling or other equipment is inadvisable, as most frequently a dangerous hazard is thereby created. Pulling or lifting of the pipe, before it is released, is apt to cause it to jump out of the hole when the coupling is released.

As different embodiments may be made of this inventive concept and modifications may be made in the embodiment hereinbefore shown and described, it will be understood that the matter herein is to be interpreted as illustrative, merely, and not in a limiting sense.

What we claim is:

1. A release coupling for attaching sections of pipe together, comprising a pair of tubular sections arranged in end-to-end relation with respect to each other, one of said tubular sections having an annular reduced part and an annular shoulder surrounding said reduced part, said shoulder being provided with sockets on its under-side thereof, the other of said tubular sections being provided with an annular enlargement, a slidable sleeve interposed within said pair of sections, said sleeve including an annular flange adjacent one end thereof and having securing means on its opposite end, said sections and sleeve being so arranged that the annular enlargement of said other section embraces the annular reduced part of said one section and the securing means on the opposite end of said sleeve, said flange being provided with diametrically-opposed lugs projecting vertically therefrom for engagement with said sockets to secure the sleeve against rotation, and means on the annular enlargement of said other section engaging the securing means on said sleeve for connecting the sections together.

2. A release coupling for attaching sections of pipe together, comprising a pair of tubular sections arranged in end-to-end relation with respect to each other, one of said tubular sections having an annular reduced part and an annular shoulder surrounding said reduced part, said shoulder being provided with sockets on its under-side thereof, the other of said tubular sections being provided with an annular enlargement interiorly threaded for a portion of its length, a slidable sleeve interposed within said pair of sections, said sleeve including an annular flange adjacent one end thereof and being provided with an exteriorly-threaded portion adjacent its opposite end, said sections and sleeve being so arranged that the annular enlargement of said other section embraces the annular reduced part of said one section and the threaded end of said sleeve, said flange being provided with diametrically-opposed lugs projecting vertically therefrom for engagement with said sockets to secure the sleeve against rotation, and a removable annular sealing element interposed between the transverse meeting edges of said tubular sections, the interiorly-threaded portion on the annular enlargement of said other section being in engagement with the exteriorly-threaded portion on said sleeve for connecting said sections together.

CARROLL N. NICODEMUS.
ALBERT E. GREGG.

REFERENCES CITED

The following references are of record in the file of this patent:

UNITED STATES PATENTS

| Number | Name | Date |
|---|---|---|
| 434,116 | Ricketts | Aug. 12, 1890 |